(12) United States Patent
Ali et al.

(10) Patent No.: US 12,099,497 B2
(45) Date of Patent: Sep. 24, 2024

(54) INCREMENTAL DATA CLUSTERING MODEL FOR BASKET ANALYSIS BY PREDICTION SERVICES

(71) Applicant: NCR Voyix Corporation, Atlanta, GA (US)

(72) Inventors: Sarfaraz Ali, Telangana (IN); Faiz Ahmed, Karimnagar (IN); Srinivas Kadhire, Serilingam Pally (IN)

(73) Assignee: NCR Voyix Corporation, Atlanta, GA (US)

( * ) Notice: Subject to any disclaimer, the term of this patent is extended or adjusted under 35 U.S.C. 154(b) by 100 days.

(21) Appl. No.: 17/658,850

(22) Filed: Apr. 12, 2022

(65) Prior Publication Data

US 2023/0325379 A1 Oct. 12, 2023

(51) Int. Cl.
*G06F 16/23* (2019.01)
*G06F 16/22* (2019.01)

(52) U.S. Cl.
CPC ...... *G06F 16/2379* (2019.01); *G06F 16/2246* (2019.01); *G06F 16/2255* (2019.01)

(58) Field of Classification Search
CPC ............. G06F 16/2379; G06F 16/2246; G06F 16/2255
USPC ........ 707/703, 741, 748, 750, 797, 803, 805
See application file for complete search history.

(56) References Cited

U.S. PATENT DOCUMENTS

| | | | | |
|---|---|---|---|---|
| 6,920,468 | B1 * | 7/2005 | Cousins | G06F 16/24564 707/999.203 |
| 7,433,879 | B1 * | 10/2008 | Sharma | G06F 16/54 707/999.005 |
| 8,401,986 | B1 * | 3/2013 | Franke | G06N 5/025 706/47 |
| 2020/0272489 | A1 * | 8/2020 | Klemenz | G06F 8/427 |
| 2020/0311638 | A1 * | 10/2020 | Kumar | G06Q 10/06315 |
| 2023/0267162 | A1 * | 8/2023 | Nissan | G06F 40/166 715/234 |

* cited by examiner

*Primary Examiner* — Phong H Nguyen
(74) *Attorney, Agent, or Firm* — Schwegman Lundberg & Woessner, P.A.

(57) ABSTRACT

A data model is derived from transaction data. The model is represented in a combination data structure for a tree and a hash table. The hash table provides direct access to leaves of the tree, each leaf comprises a frequency count for a particular unique basket of items detected in the transaction data. Mining the combination data structure does not require recursive traversal of the tree. Moreover, derivation is performed with just two passes on the transaction data, during each pass multiple concurrent reducer tasks handle a unique portion of the transaction data providing parallel processing during creation and derivation which improves the processor elapsed time to complete the combination data structure. Furthermore, updates to the data structure are incremental without requiring any additional passes on the original transaction data and without requiring full traversal of the tree. Output from the mining is provided as input to predictor services.

20 Claims, 3 Drawing Sheets

INCREMENTAL DATA CLUSTERING MODEL FOR BASKET ANALYSIS BY PREDICTION SERVICES

BACKGROUND

Basket analysis is a technique by which an affinity or an association that any given item or any combination of the items (which are presented in a given single transaction) has with a different item or different combinations of other items previously purchased in other transactions. The manner in which the affinities or associations are represented in an underlying data model is consumed as input by a variety of prediction services for a variety of purposes of such as up-selling customers on items, promoting/advertising items in bundles, arranging the items within a store, creating segments of different behaving customers based on their basket analysis behaviors, and/or cross-selling items to the customers.

Of import to any data model is the frequency with which a given combination of items for a given transaction are associated with other combinations of other items in other transactions. The frequencies of each combination are then mathematically processed into clusters and/or mapped in multidimensional space to identify or to derive the affinities, which are then consumed as input by predictions services. As transactions are processed and new items are offered, the complexity in maintaining the multidimensional space and/or clusters accurately in the data model exponentially increases.

Modeling the data in clusters and/or multidimensional space is processor and memory intensive that often requires many passes on the data and experiences a significant amount of elapsed time to complete. As a result, the data model is infrequently updated because it is impractical to due so. But the transaction data upon which the model is based is dynamic and continuously being generated and updated within the underlying data store 24 hours a day, seven days a week, and 365 days a year. As a result, the prediction services can be inaccurate when used on real-time data for real time predictions because the underlying model upon which the services rely on is out-of-date.

SUMMARY

In various embodiments, system and methods for incrementally maintaining a data clustering model for basket analysis by prediction services are presented.

According to an aspect, a method for incrementally maintaining a data clustering model for basket analysis by prediction services is presented. A first table is generated from transaction records; the first table comprises first entries, each first entry comprises an item code and a first frequency count for the corresponding item code detected in the transaction records. Each item code from a set of item codes associated with each transaction record for the set of item codes is inserted into a tree data structure as a path within the tree data structure. A second frequency count is updated on a leaf node of the corresponding path within the tree data structure each time the corresponding path is encountered within the transaction records. A hash table is maintained for the tree data structure; each hash entry comprises a hash value to the corresponding leaf nodes of the tree data structure. A data model for basket analysis of subsequent transaction data is represented as a combination of the tree data structure and the hash table and an interface is provided to a predictor service for mining and updating the data model.

DETAILED DESCRIPTION

Figure 1:
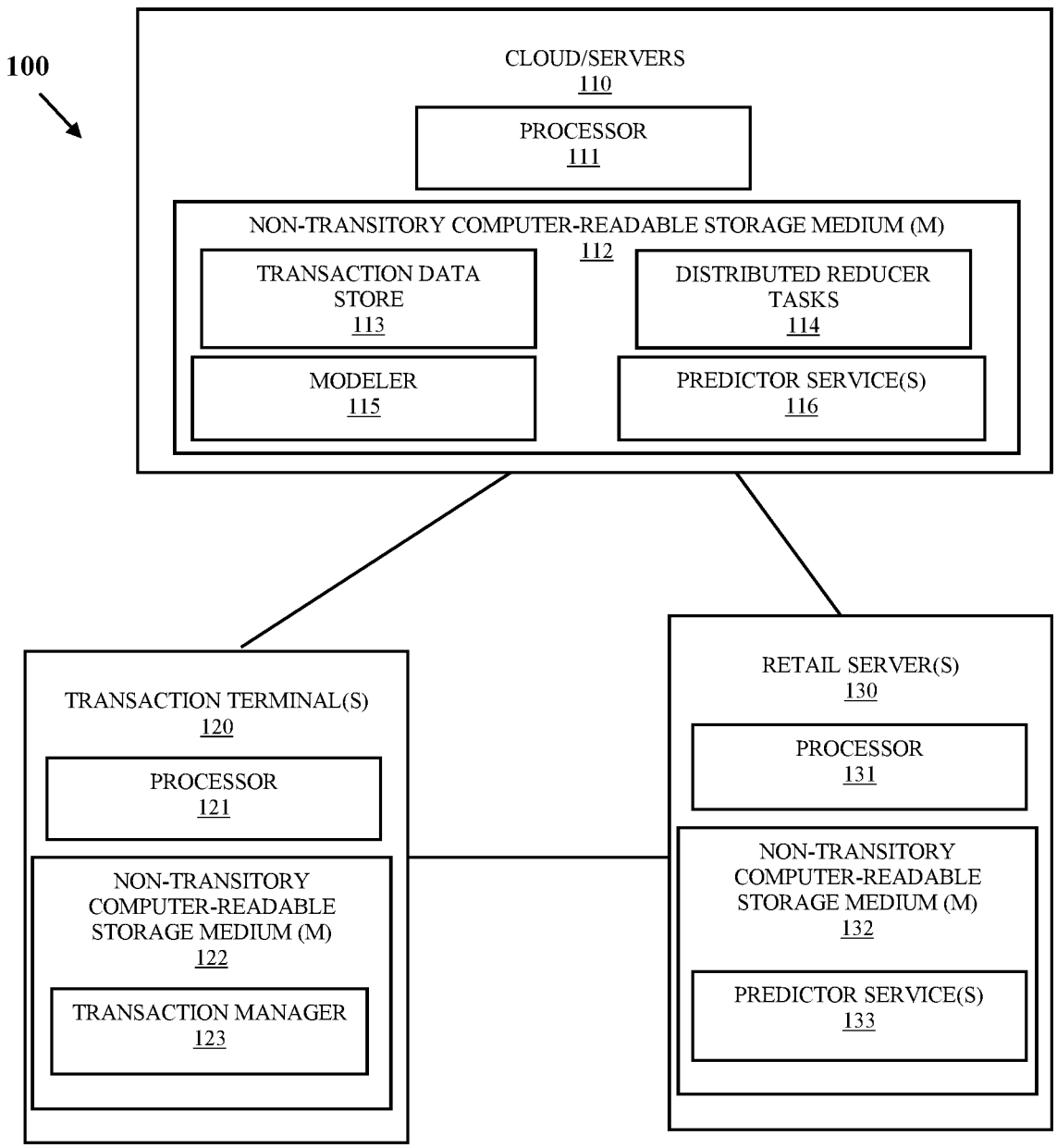
FIG. 1 is a diagram of a system for incrementally maintaining a data clustering model for basket analysis by prediction services, according to an example embodiment.

FIG. 1 is a diagram of a system 100 for incrementally maintaining a data clustering model for basket analysis by prediction services, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of incrementally maintaining a data clustering model for basket analysis by prediction services presented herein and below.

As will be discussed more completely herein and below, system 100 permits incremental updates to a data model that supports a prediction service. The transaction data from which the model is derived and need only be scanned (passed over) and processed twice (two phases). During each phase multiple map reduce tasks can be processed in parallel and concurrently to substantially reduce the elapsed processing time needed to pass over the transaction data twice. During the first pass, the transaction data is segmented into portions or blocks, each block concurrently processed by one of the first-phase map reducer tasks. Each first-phase map reducer task produces a table comprising each item (item identifier/code) uniquely appearing in the block of data that the corresponding reducer task is processing along with a total frequency count for that unique item code referred to as single or 1-item list/table. An orchestrator reducer tasks then aggregates all the single item tables into a single item table comprising the aggregated frequency count for each unique item. The orchestrator reducer task then removes all single item codes that are below a given threshold frequency count and the modified and aggregated single item table is passed to the second phase and its reducer tasks.

During the second phase, second map reducer tasks can again be processed in parallel across multiple devices currently with one another, each second map reducer is provided the single item table produced at the end of phase one along with a unique portion of the transaction data. Each second map reducer removes the infrequent item codes that are not present in the aggregated single item table to reduce the size of each available set of item codes to evaluate in a given transaction being processed. For example, if a given transaction comprises item codes a, b, c, d, f but the item codes does not comprise item code f, the set of item codes for the transaction being evaluated becomes a, c, d, f. This essentially prunes the sizes of the sets of item codes being evaluated. Next, each second map reducer begins assembling a tree data structure along with hash values into leaves of the tree with the initial root node being null. An order of tree creation proceeds from the largest set size of item codes available in the corresponding second map reducer's portion of transactions to a smallest set size defined by a threshold. For example, if the largest prune set size in the transaction data is 5, the corresponding second map reducer begins assembling the tree with that set size of 5.

Each item code of each transaction set of item codes is then inserted into the tree data structure, such that the last item (item codes are sorted before tree insertion within each set of item codes for a given item code) of each set of item codes for each transaction appears as a leaf node within the tree being assembled by the corresponding second map reducer. For example, assuming an initial first transaction as a, b, c, d, e, f, the second map reducer inspects the root for a presence of a as a child node and finds none, so a is set as a child of the root node. Next, b is set as a child of a, and so on until the final leaf node for the first transaction being processed is represented in the tree by leaf node f having a parent of e, and so on until a is reached with a parent of the null root. The leaf node comprises a field with a frequency count of 1. For each next set of items codes for each next transaction, the root is traversed for a child associated with the first item code in the corresponding transaction, if none is present a new child is created, and the insertion of the item codes continues until a leaf node is inserted with its frequency count. This process continues until the transactions of the corresponding set size are inserted into the tree. The next set size is then obtained and inserted into the tree until all the transactions of all the sizes are inserted into the tree by the corresponding second map reducer.

An orchestrator during the second phase merges all the trees into a single tree as each tree is received from each of the second map reducers. At this point, the data model comprises a tree where each leaf of the tree is directly accessible through a hash table to obtain a corresponding frequency count. So for a given transaction with a leaf node of item code x, the hash table provides directed access to the tree at all leaf nodes of item codes x, a preceding item code of y in the given transaction can then be used to traverse the tree and find a leaf node of item code x having a parent of item code y and so on in order to ensure that the frequency count for the given transaction can be updated for the given transaction without passing requiring a reconfiguration and pass on the previously processed transaction data to update the model (tree and hash table data structure).

When a given predictor service desires to consume a portion of the data model as input for a prediction of the service, the item list (set) for the given transaction is processed by a phase one map reducer to prune the list if infrequent item codes and provide a table of single item codes. A mining map reducer then takes the item set for the transaction and removes the infrequent item codes. Next, the mining map reducer begins with the remaining largest size of the item list N and repetitively generates all combinations of item codes at a reduced item set size N−1 until a threshold set size 2 or some other preconfigured size is reached. For example, if is the transaction comprises item codes a, b, c, and f and the minimum threshold size is 2 but f is not provided by the phase one mapper in the table, the second map reducer generates item code sets of abc; ab; ac; and bc. The second map reducer then hashes the hash table to obtain a link within the tree to leaf nodes of c having a set size of 3, directly access the leaf nodes for a parent node of b and discards the other leaf nodes with a different parent node, checks the parent of b for a parent of a, checks the parent of a for a parent of root and obtains from the corresponding leaf node of c its frequency count. This is repeated for each of the remaining item sets (permutations of ab, ac, and bc). The item sets (permutations along with corresponding item codes) and their corresponding frequency counts are returned as input to the prediction service. The transaction item codes may be processed in the manner discussed above to update the data model before the mining map reducer provides the input to the predictor service, in this way the model is up-to-date for each input requested by each predictor service.

It is noted that unlike conventional data modeling techniques, the tree does not require full traversal, there is no recursion that is necessary, updates are incremental, and direct access is provided to the leaf nodes. This means that system 100 is substantially less processor and memory intensive than are conventional approaches and results are delivered substantially faster (less processing elapsed time) than the conventional approaches. Furthermore, because system 100 utilized concurrent threads in parallel processing the tree is created, updated, and mined substantially faster than what is available in the industry.

In an embodiment, the tree is implemented, via the map reducers, utilizing a combination of a Frequent Itemset Ultrametric (FIUT) and a Density-Based Spatial Clustering with Noise (DBSCAN) algorithm (DB-FIUT). This allows for clustering that may contain unusual geometric shapes or pattern when plotted in multidimensional space to capture item sets affinities that are missed by traditional approaches and reduces the complexities associated with deriving, mining, and updating the tree.

As used herein, "data model" is intended to mean a combination tree data structure and one or more hash tables that provide direct access to different portions of the tree data structure.

It is within this context, that the various embodiments of the teachings are now discussed with initial reference to FIG. 1 and system 100.

System 100 comprises one or more clouds/servers 110, transaction terminals 120, and retail servers 130.

Each cloud/server 110 comprises a processor 111 and a non-transitory computer-readable storage medium 112. Medium 112 comprises executable instructions for access to a transaction data store 113, multiple distributed reducer tasks 114, a modeler 115, and, optionally, one or more predictor services 116. Processor 111 obtains or is provided the executable instructions from medium 112 causing processor 111 to perform operations discussed herein and below with respect to 113-116.

Each transaction terminal 120 comprises a processor 121 and a non-transitory computer-readable storage medium 122. Medium 132 comprises executable instructions for a transaction manager 123. Processor 121 obtains or is provided the executable instructions from medium 122 causing processor 121 to perform operations discussed herein and below with respect to 123.

Each retail server 130 comprises a processor 131 and a non-transitory computer-readable storage medium 132. Medium 132 comprises executable instructions for one or more predictor services 133. Processor 131 obtains or is provided the executable instructions from medium 132 causing processor 131 to perform operations discussed herein and below with respect to 133.

Initially, a retailer associated with transaction terminals 120 provides or provides access to its transaction data to modeler 115. The transaction data comprises transaction records per transaction, each transaction record minimally includes a retailer identifier for the retailer, a transaction terminal identifier for the transaction terminal 120, a transaction identifier for the transaction, and item codes for items purchased in the corresponding transaction. After a data model is derived for basket analysis of the transaction by a given predictor service 116 and/or 133, real-time transaction data may be directly provided over a network connection from terminals 120 (the transaction data generated by transaction manager 123 for the transactions on terminals 120) for dynamically updating and maintaining the model. Alternatively, the transaction data processed after the model is derived can be provided by retail server 130 and/or by each transaction terminal 120 (each transaction manager 123) at preconfigured intervals of elapsed time.

Modeler 115 stores the transaction data within transaction data store 113 and links it to the retailer server 130. For initial derivation of the data model (i.e., for first creation of the data model), modeler 115 initiates a first phase of data model derivation by segmenting the transaction data for the retailer into blocks or portions, each block of portion is simultaneous provided to multiple instances of a first reducer task 114 for parallel and concurrent processing. Each first reducer task 114 pass over its block of transaction data and produces a table comprise single set item codes and a frequency with which each item associated with a unique item code was encountered in the corresponding block of transaction data. Each first reducer task 114 returns its single item table back to an orchestrator reducer task 114 that removes item codes associated with frequency counts that are below a threshold (a configurable threshold) and aggregates the frequency counts for each unique item code into a single table, sorted by item code.

After phase 1, modeler 115 again segments the original transaction data into portions or blocks and passes the single table and the blocks to second reducer tasks 114. Each second reducer task 114 removes any item code from any given transaction record being processed that was not present in the table thereby reducing the sizes or pruning the sizes of some of the transaction records by removing such infrequent item codes. Next, each second reducer task 114 sorts the transaction records based on sizes of the item code sets from highest size to lowest size. Beginning with the highest size and continuing to a threshold smallest size, the corresponding second reducer task 114 begins derivation and creation of a sub tree associated with that second reducer task 114 and its block of transaction data. The initial node is labeled as null for the sub tree, each item code of each transaction is then inserted into the tree until a leaf of the tree is the last item code associated with that transaction record (this was discussed above in detail. When any given last item code of a given transaction is encountered, the corresponding leaf node in the tree has a frequency counter value updated by 1, such that a frequency count for the basket of items associated with that transaction is maintained on the leaf node. A unique hash value for the leaf node is then maintained in a hash table to directly access that linked node (the hash table may include a linked list associated with the hash value such that multiple leaf nodes are directly accessed off that hash value with a given leaf node is encountered multiple times by the corresponding second reducer task 114. As each second mapper task 114 completes its sub tree with frequency counts and hash table, the sub tree and hash table is returned to a second orchestrator task 114. The orchestrator task merges the sub trees are merged into a single tree and the hash tables are merged into a single has tree for the single tree.

After phase 2, modeler 115 now as a data model upon which baskets of items and the affinities between other baskets of items can be provided as input to predictor services 116 and/or 133.

A third reducer task 114 can be used to providing mining services associated with the modeler 115 based on a given transaction record or a set of transaction records provided by the predictor service to modeler 115 for affinity analysis. The third reducer task 114 sorts the item codes in the transaction record, removes any infrequent and non-considered item code from the item code list, and generates permutations from the largest item set size down to the smallest considered item set size for each permutation (combination) of the item codes. For each last item code in each combination, the third reducer task 114 access the hash label for the locations of leaf nodes within the tree that comprises the corresponding item code and ensures it is the correct branch of the tree by comparing the next to last item code in the combination to the corresponding parent node in the leaf node being evaluated, and so on until the correct branch is located. The frequency count for that leaf node is obtained from the tree and associated with the combination that was being evaluated. This continues until all the combinations and there corresponding frequency counts are obtained. It is noted that each combination may be provided in parallel to a separate instance of a third reducer task 114 such that each combination and its frequency count is returned rapidly to a third orchestrator task; the orchestrator task aggregates the combinations and corresponding frequency counts and returns as output to modeler 114 for the original transaction record provided by the predictor service 116 and/or 133. Modeler 115 provides each combination of item codes and the corresponding frequency count to the predictor service 116 and/or 133.

Incremental updates to the data model can be processed by modeler by using the first, second, and third reducer tasks 114 in a variety of combinations. For example, a batch of new transaction data may be sent to the first reducer tasks 114 and second reducer tasks 114 with the orchestrator second reducer task 114 merging the temporary tree and its frequency counts for the combinations of item codes into the tree and hash table associated with the data model being updated. For each real-time transaction record provided for update can be achieved with just a single second reducer task 114. For example, the modeler 115 updates the existing single item frequency counts for the item codes based on the item codes in the transaction record and passes the existing tree, the existing hash table, and the updated single item code table (pruned for infrequent items) along with the transaction to a second reducer task 114. Output from the second reducer task 114 is an up-to-date tree and hash table. In another case, the transaction record being provided to the third reducer task 114 can be updated in any of the above discussed manners before the third reducer task 114 is processed to return the item combinations for the transaction and the corresponding frequency counts for each item combination. In still another case, the third reducer task 114 itself can perform the update and the output of combinations with frequency counts simultaneously by performing the update to the corresponding leaf node of the tree (insertion or just increasing the frequency count on an existing leaf node) and then perform the processing associated with providing the item combinations and the corresponding frequency counts.

The predictor services 116 and 133 consume provide as input to modeler 115 transaction records and receive as output from modeler 115 the item combinations (permutations, sets, etc.) for each transaction record and that combinations corresponding frequency count as determined by the third reducer task 114 (discussed above). Modeler 115 may interact with each predictor service 116 and 133 through an Application Programming Interface (API). Additionally, modeler 115 may be configured to provide the output from the third reducer task 114 in a format expected as input by each of the predictor services 116 and 133 through the API.

In an embodiment, modeler 115 is provided as Software-as-a-Service (SaaS) to each of the predictor services 116 and 133.

In an embodiment, the predictor services 116 and 133 provides promotion predictions for cross and/or up selling, suggested placement of items within a store, suggested advertisements on web pages or mobile applications, suggested combinations of items, suggested or predicted inventory, etc.

In an embodiment, the transaction terminals 120 may comprise any of, all of, or some combination of Automated Teller Machines (ATMs), Self-Service Terminals (SSTs), Point-Of-Sale (POS) terminals, airport/travel/rental car/hotel kiosks, user-operated mobile devices, online servers, etc.

The above-referenced embodiments and other embodiments are now discussed with reference to FIGS. 2-3.

Figure 2:
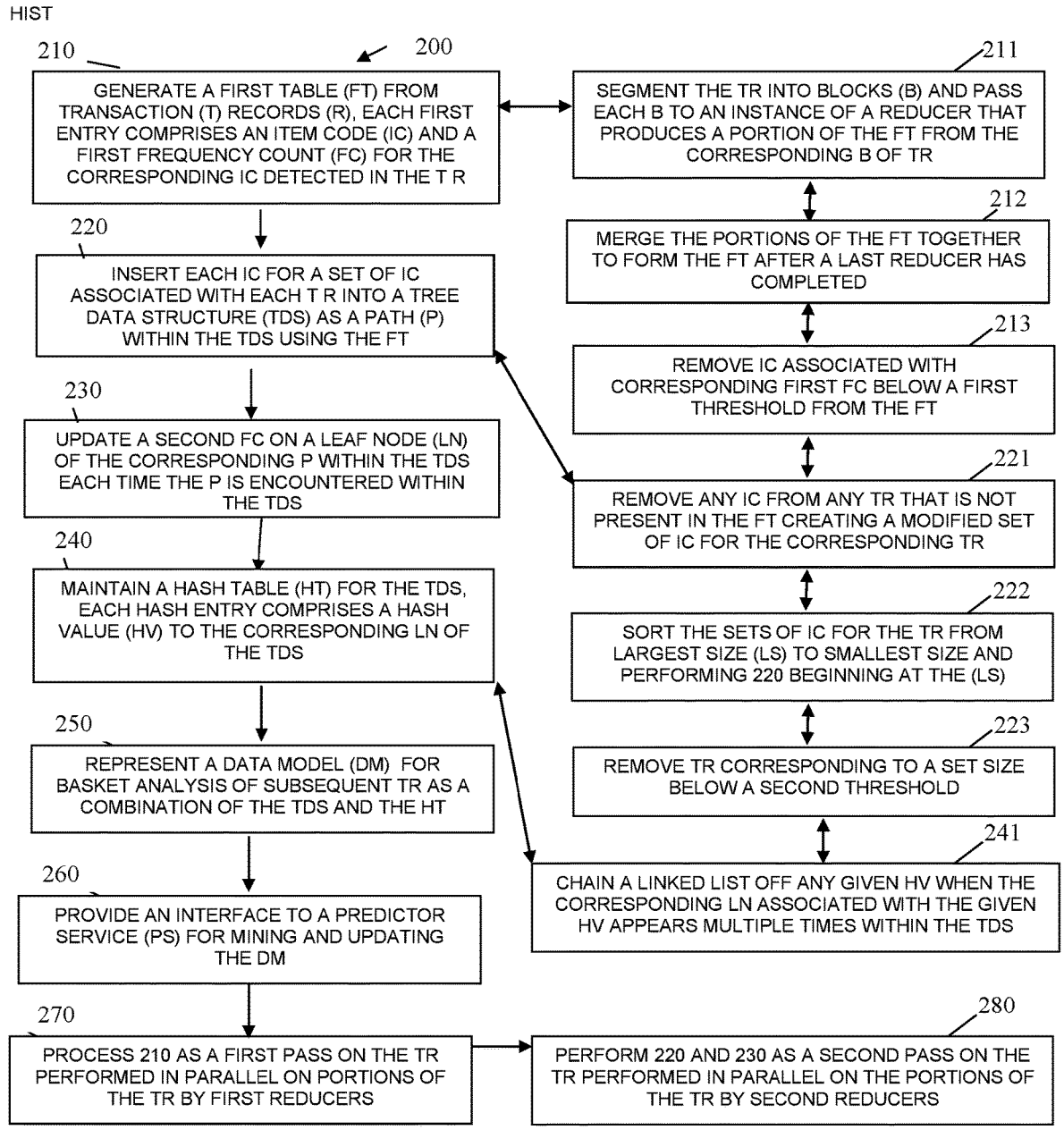
FIG. 2 is a diagram of a method for incrementally maintaining a data clustering model for basket analysis by prediction services, according to an example embodiment.

FIG. 2 is a diagram of a method 200 for incrementally maintaining a data clustering model for basket analysis by prediction services, according to an example embodiment. The software module(s) that implements the method 200 is referred to as a "basket analyses data modeler." The basket analyses data modeler is implemented as executable instructions programmed and residing within memory and/or a non-transitory computer-readable (processor-readable) storage medium and executed by one or more processors of one or more devices. The processor(s) of the device(s) that executes the basket analyses data modeler are specifically configured and programmed to process the basket analyses data modeler. The basket analyses data modeler has access to one or more network connections during its processing. The connections can be wired, wireless, or a combination of wired and wireless.

In an embodiment, the device that executes basket analyses data modeler is cloud 110. In an embodiment, the device that executes basket analyses data modeler is server 110.

In an embodiment, portions of basket analyses data modeler are processed in parallel as concurrent instances on multiple devices.

In an embodiment, the basket analyses data modeler is all of, or some combination of distributed reducer tasks 114 and/or modeler 115.

At 210, the basket analyses data modeler generates a first table from transaction records. Each first entry of the first table comprises an item code and a first frequency count for the corresponding item code detected in the transaction records.

In an embodiment, at 211, the basket analyses data modeler segments the transaction records into blocks and passes each block to an instance of a reducer 114 that produces a portion of the first table from the corresponding block of transaction records.

In an embodiment of 211 and at 212, the basket analyses data modeler merges the portion of the first table together to form the first table after a last reducer 114 has completed.

In an embodiment of 212 and at 213, the basket analyses data modeler removes item codes associated with a first frequency count below a first threshold from the first table.

At 220, the basket analyses data modeler inserts each item code for a set of item codes associated with each transaction record as a path into a tree data structure.

In an embodiment of 213 and 220, at 221, the basket analyses data modeler removes any item code from any transaction record that is not present in the first table creating a modified set of item codes for the corresponding transaction record.

In an embodiment of 221 and at 222, the basket analyses data modeler sorts the sets of item codes for the transaction records from largest size to smallest size and performs 220 beginning at the largest size.

In an embodiment of 222 and at 223, the basket analyses data modeler removes transaction records corresponding to a set size below a second threshold.

At 230, the basket analyses data modeler updates a second frequency count on a leaf node of the corresponding path within the transaction data structure each time the path is encountered within the tree data structure.

At 240, the basket analyses data modeler maintains a hash table for the transaction data structure. Each hash entry comprises a hash value to the corresponding leaf node of the transaction data structure.

In an embodiment of 223 and 240, at 241, the basket analyses data modeler chains a linked list off any given hash value when the corresponding leaf node associated with the given hash value appears multiple times within the tree data structure and is associated with a different unique path within the tree data structure.

At 250, the basket analyses data model represents a data mode for basket analysis of subsequent transaction records as a combination of the tree data structure and the hash table.

At 260, the basket analyses data modeler provides an interface to a predictor service 116 and/or 133 for mining and updating the data model.

In an embodiment, at 270, the basket analyses data modeler processes or performs 210 as a first pass on the transaction records that is performed in parallel on portions of the transaction records by first reducers 114.

In an embodiment of 270 and at 280, the basket analyses data modeler performs or processes 220 and 230 as a second pass on the transaction records performed in parallel on the portions of the transaction records by second reducers 114.

Figure 3:
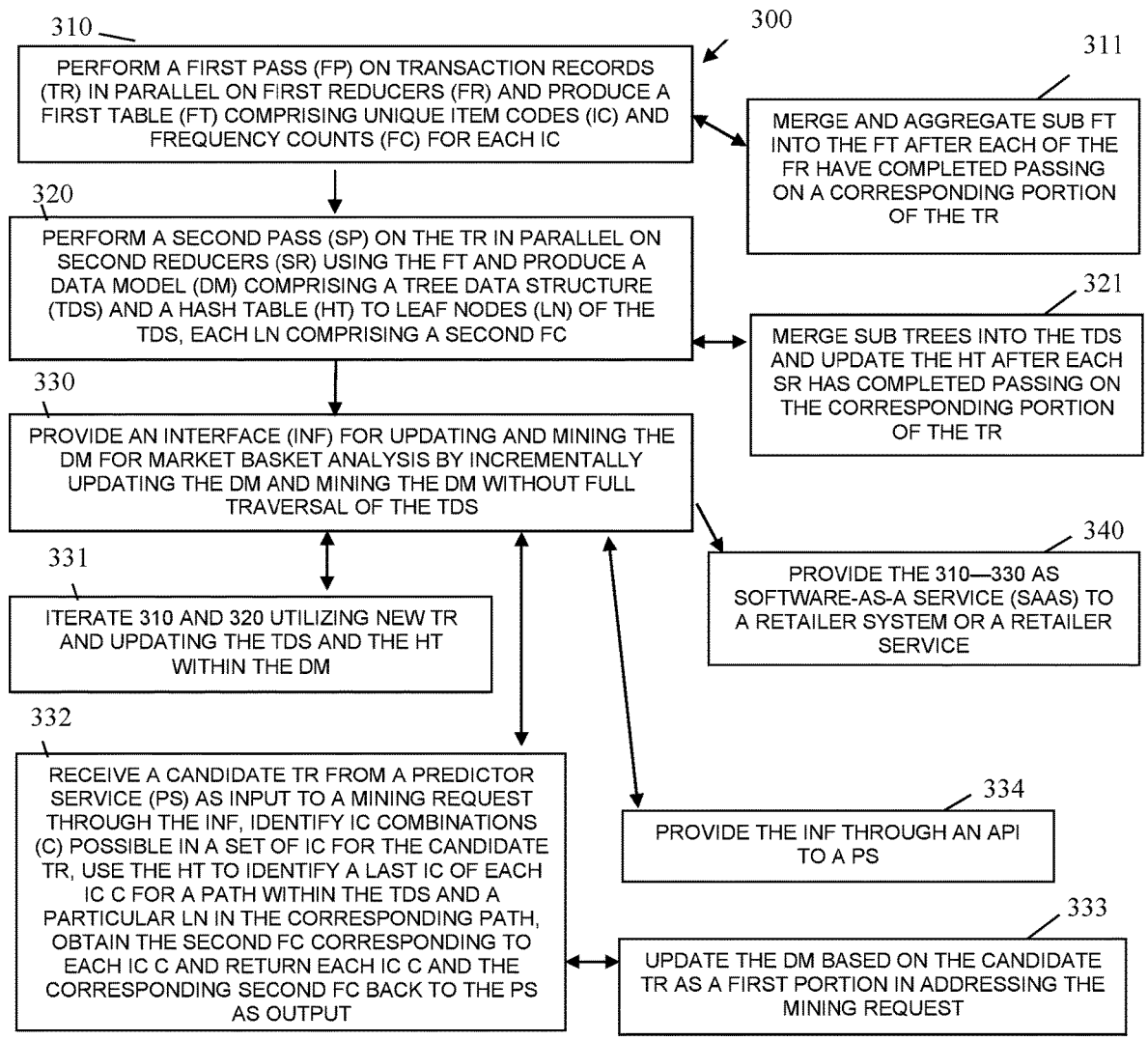
FIG. 3 is a diagram of another method for incrementally maintaining a data clustering model for basket analysis by prediction services, according to an example embodiment.

FIG. 3 is a diagram of another method 300 for incrementally maintaining a data clustering model for basket analysis by prediction services, according to an example embodiment. The software module(s) that implements the method 300 is referred to as a "market basket analysis service." The market basket analysis service is implemented as executable instructions programmed and residing within memory and/or a non-transitory computer-readable (processor-readable) storage medium and executed by one or more processors of one or more devices. The processor(s) of the device(s) that executes the market basket analysis service are specifically configured and programmed to process the market basket analysis service. The market basket analysis service has access to one or more network connections during its processing. The network connections can be wired, wireless, or a combination of wired and wireless.

In an embodiment, the device that executes the market basket analysis service is cloud 110. In an embodiment, the device that executes the market basket analysis service is server 110.

In an embodiment, one or more portions of the market basket analysis service is processed as independent and parallel instances on multiple devices simultaneously.

In an embodiment, the market basket analysis service one or more of distributed reducer tasks 114, modeler 115, predictor service(s) 116, and/or method 200.

The market basket analysis service presents another and, in some manners, enhanced processing perspective to that which was discussed above with FIG. 2 and method 200.

At 310, the market basket analysis service performs a first pass on transaction records in parallel on first reducers 114 and produces a first table comprising unique item codes and frequency counts for each item code.

In an embodiment, at 311, the market basket analysis service merges and aggregates sub first tables produced by each of the first reducers 114 into the first table after each of the first reducers 114 has completed passing on its corresponding portion of the transaction records.

At 320, the market basket analysis service performs a second pass on the transaction record in parallel on second reducers 114 using the first table and produces a data model comprising a tree data structure and a hash table to leaf nodes of the tree data structure. Each leaf node of the tree data structure comprising a second frequency count for a unique path within the tree data structure.

In an embodiment of 311 and 320, at 321, the market basket analysis service merges sub trees into the tree data structure and updates the hash table after each second reducers 114 has completed passing on its corresponding portion of the transaction records.

At 330, the market basket analysis service provides an interface for updating and mining the data model for market basket analysis by incrementally updating the data model and mining the data model without full traversal of the tree data structure.

In an embodiment, at 331, the market basket analysis service iterates 310 and 320 utilizing new transaction records and update the tree data structure and the hash table within the data model.

In an embodiment, at 332, the market basket analysis service receives a candidate transaction record from a predictor service 116 and/or 133 as input to a mining request through the interface (modeler 115). The market basket analysis service identifies all item combinations (permutations) possible in a set of item codes for the candidate transaction record. The market basket analysis service uses the hash table to identify a last item code of each item code combination for a path within the tree data structure and a particular leaf node in the corresponding path. The market basket analysis service obtains the second frequency count corresponding to each item code combination and returns each item code combination and the corresponding second frequency code back to the predictor service 116 and/or 133 as output.

In an embodiment of 332 and at 333, the market basket analysis service updates the data model based on the candidate transaction record as a first portion in addressing the mining request. So, the data model is updated with the candidate transaction and its item combinations (in terms of the second frequency counts) before the hash table is used to identify the last item code of each item code combination.

In an embodiment, at 334, the market basket analysis service provides the interface through an API to the predictor service 116 and/or 133.

In an embodiment, at 340, the market basket analysis service (310-330) is processed as a SaaS to a retailer system or a retailer service.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method implemented on a computer system comprising one or more processors and memory storing instructions executed by at least one processor, the method comprising:

generating a first table from transaction records, the first table comprises first entries, each first entry comprises an item code and a first frequency count for the corresponding item code detected in the transaction records;

analyzing the transaction records using a configured predictive model to identify patterns of item purchases and generating predictive models based on the identified patterns;

inserting each item code from a set of item codes associated with each transaction record for the set of item codes into a tree data structure as a unique path within the tree data structure using the first table, wherein the tree data structure is configured to facilitate efficient data retrieval and update in response to real-time transaction data;

updating a second frequency count on a leaf node of the corresponding path within the tree data structure each time the unique path is encountered within the transaction records;

maintaining a hash table for the tree data structure, wherein each hash entry comprises a hash value to the corresponding leaf nodes of the tree data structure, configured to enable direct access to data nodes for rapid data processing;

representing a data model for basket analysis of subsequent transaction data as a combination of the tree data structure and the hash table; and providing an interface to a predictor service for mining and updating the data model, wherein the interface is configured to handle requests for data analysis and model updated in real time.

2. The method of claim 1, wherein generating further includes segmenting the transaction records into blocks and passing each block to an instance of a reducer that produces a portion of the first table from the corresponding block of transaction records.

3. The method of claim 2, wherein passing further includes merging the portions of the first table together to form the first table after a last reducer has completed.

4. The method of claim 3, wherein merging further includes removing item codes associated with corresponding first frequency counts below a first threshold from the first table.

5. The method of claim 4, wherein inserting further includes removing any item code from any transaction record that is not present in the first table creating a modified set of item codes for the corresponding transaction record.

6. The method of claim 5, wherein removing any item code further includes sorting the sets of item codes for the transaction records from largest set size to smallest set size and performing the inserting beginning at the largest size.

7. The method of claim 6, wherein sorting further includes removing transaction records corresponding to a set size that is below a second threshold.

8. The method of claim 7, wherein maintaining further includes chaining a liked list of the hash values off a given hash value when the corresponding leaf node associated with the given hash value appears multiple times within the tree data structure.

9. The method of claim 1 further comprising, processing the generating as a first pass on the transaction records performed in parallel on portions of the transaction records by first reducers.

10. The method of claim 9 further comprising, processing both the inserting and the updating as a second pass on the transaction records performed in parallel on the portions of the transaction records by second reducers.

11. A method, comprising:
performing a first pass on transaction records in parallel on first reducers and producing a first table comprise unique item codes and frequency counts for each unique item code;
analyzing the transaction records using a configured predictive model to identify patterns of item purchases and generating predictive models based on the identified patterns;
performing a second pass on the transaction records in parallel on second reducers using the first table producing a data model comprising a tree data structure and a hash table to leaf nodes of table data structure, each leaf node comprising a second frequency count; and
providing an interface for updating and mining the data model for market basket analysis by incrementally updating the data model and mining the data model without full traversal of the tree data structure, wherein the interface is configured to handle requests for data analysis and model updated in real time.

12. The method of claim 11, wherein performing the first pass further includes merging and aggregating sub first tables into the first table after each of the first reducers has completed passing on a corresponding portion of the transaction records.

13. The method of claim 12, wherein performing the second pass further includes merging sub trees into the tree data structure and updating the hash table after each of the second reducers has completed passing on the corresponding portion of the transaction records.

14. The method of claim 11, wherein providing further includes iterating the performing of the first pass and the performing of the second pass utilizing new transaction records to update the tree data structure and the hash table within the data model.

15. The method of claim 11, wherein providing further includes receiving a candidate transaction record from a predictor service as input to a mining request through the interface, identifying item code combinations possible in a set of item codes for the candidate transaction record, using the hash table to identify a last item code of each item code combination for a path within the tree data structure and a particular leaf node in the corresponding path, obtaining the second frequency count corresponding to each particular leaf node, and returning each item code combination and the corresponding second frequency count back to the predictor service as output.

16. The method of claim 15, wherein receiving the candidate transaction record further includes updating the data model based on the candidate transaction record as a first portion in addressing the mining request.

17. The method of claim 11, wherein providing the interface through an Application Programming Interface (API) to a predictor service.

18. The method of claim 11 further comprising, processing the method as Software-as-a-Service (SaaS) to a retailer system or a retailer system.

19. A system, comprising:
at least one cloud server comprising at least one processor and a non-transitory computer-readable storage medium;
the non-transitory computer-readable storage medium comprises executable instructions;
the executable instructions when provided to and executed by the at least one processor from the non-transitory computer-readable storage medium cause the at least one processor to perform operations comprising:
performing a first pass on transaction records and producing a first table comprising unique item codes and frequency counts for each item code;
analyzing the transaction records using a configured predictive model to identify patterns of item purchases and generating predictive models based on the identified patterns; performing a second pass on the transaction records using the first table and producing a data model comprising a tree data structure and a hash table to leaf nodes of the tree data structure, each leaf node comprising a second frequency count; and
providing an interface for updating and mining the data model for market basket analysis by incrementally updating the data model without full traversal of the tree data structure, wherein the interface is configured to handle requests for data analysis and model updated in real time.

20. The system of claim 19, wherein the executable instructions associated with the performing the first pass are performed in parallel on multiple cloud servers to produce the first table during the first pass, and wherein the executable instructions associated with performing the second pass are performed in parallel on the multiple cloud servers to produce the data model.

* * * * *